April 29, 1958 M. PFEIFFER 2,832,413
CARD REPRODUCING PUNCHING MACHINES
Filed Sept. 30, 1954 7 Sheets-Sheet 1

Inventor:
Max Pfeiffer
By:
Michael S. Striker
Agt.

April 29, 1958     M. PFEIFFER     2,832,413
CARD REPRODUCING PUNCHING MACHINES
Filed Sept. 30, 1954     7 Sheets-Sheet 3

Inventor:
Max Pfeiffer
By:
Michael S. Striker
Agt.

April 29, 1958 M. PFEIFFER 2,832,413
CARD REPRODUCING PUNCHING MACHINES
Filed Sept. 30, 1954 7 Sheets-Sheet 4

Inventor:
Max Pfeiffer
By:
Michael S. Striker
Agt.

April 29, 1958     M. PFEIFFER     2,832,413

CARD REPRODUCING PUNCHING MACHINES

Filed Sept. 30, 1954     7 Sheets-Sheet 5

Inventor:
Max Pfeiffer
By:
Michael S. Striker
Agt.

April 29, 1958  M. PFEIFFER  2,832,413
CARD REPRODUCING PUNCHING MACHINES
Filed Sept. 30, 1954  7 Sheets-Sheet 6
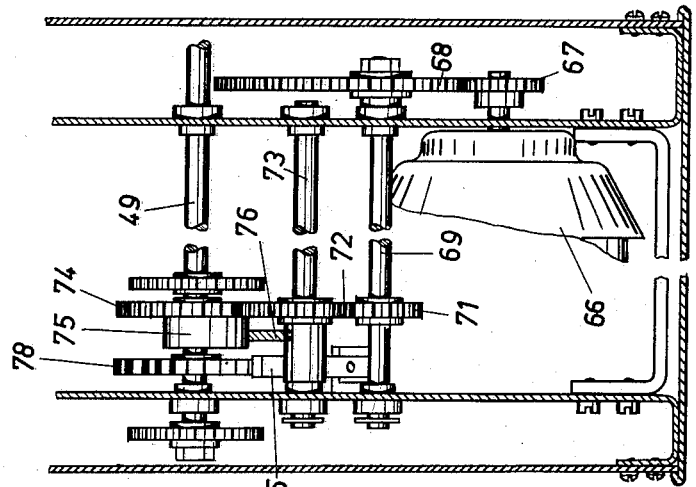
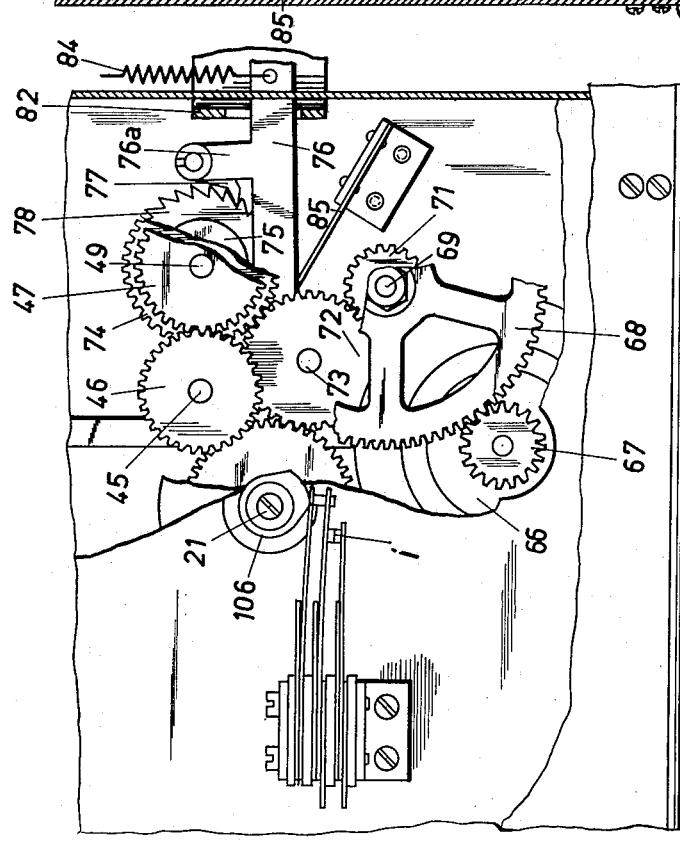
Inventor:
Max Pfeiffer
By:
Michael S. Striker
Agt.

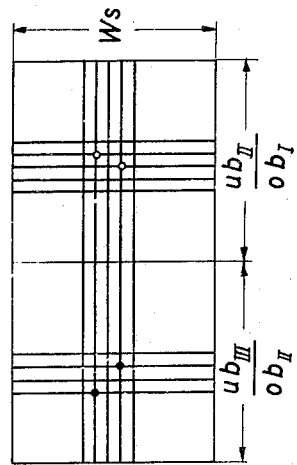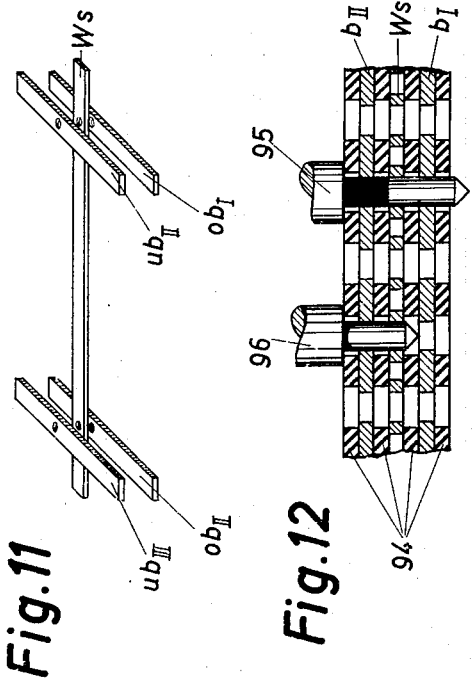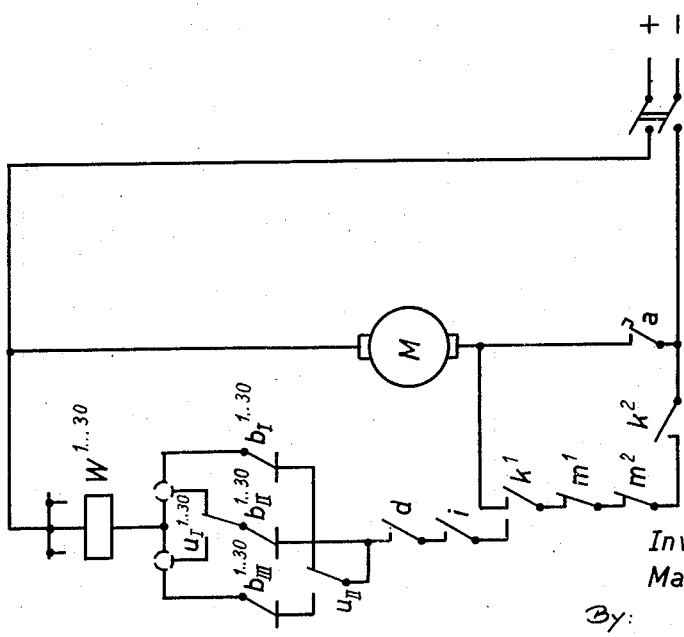

United States Patent Office 2,832,413
Patented Apr. 29, 1958

2,832,413

CARD REPRODUCING PUNCHING MACHINES

Max Pfeiffer, Nurnberg, Germany, assignor to
Michael Maul, Mittelfranken, Bavaria Application September 30, 1954, Serial No. 459,486

10 Claims. (Cl. 164—115)

Various types of machines are known for transferring the data of record cards to other record cards. The most usual form of record is a punched card in which the controlling marks are provided in form of holes; recording may be effected by printing, punching or by any other kind of marking. In the type of machines to which the invention relates the data represented by the controlling marks of a record card are transferred to the receiving cards by means of a recording mechanism. If the recording mechanism consists of a punching mechanism, such a machine is called a "card reproducer," because for instance, all or certain data of a stack of pattern cards may be transferred to another stack of receiving cards, that is to say the cards are being "reproduced."

In the narrower sense the invention relates to that type of recording machines in which the control cards are fed with a plurality of columns simultaneously past a row of analyzers and in which recording is also effected simultaneously in all places of the recording mechanism on the receiving cards fed past the latter, as is the case, for instance, in the recording machine according to German Patent 652,100 which is constructed as a card reproducer. As compared with other types of machines, this kind of recording machine affords the advantage of greater efficiency. Moreover, it permits a "column interchangeability" during the transfer.

The essential features of the present invention consist in that a machine, of the type indicated, for operating on cards having a plurality of decks of characters each deck consisting of a row of adjacent characters or character columns, is not only equipped in a simple manner but permits a column interchangeability within one deck as well as interchanging of individual decks during the transfer effected in a single card passage. Consequently, any desired column of any desired deck of the controlling card can be transferred to any desired column of any desired deck of the receiving card.

The simplicity of the machine is obtained in that a recording or marking mechanism is provided common to all decks past which mechanism the individual decks of the receiving cards are fed one after the other. When applying the column interchangeability known per se within each deck, the arbitrary deck interchangeability is obtained because, in agreement with the passage of the receiving card on the recording mechanism, the plurality of decks of the control cards are fed successively past a plurality of rows of analyzers, each of the latter analyzing all columns of a deck and because, by means of a deck shifting device, the recording mechanism common to all decks is in each instance automatically connected to all rows of analyzers which analyze the decks of the control card simultaneously.

In particular the invention relates to a machine in which analyzing of the n decks of the control cards is effected by 2n—1 rows of analyzers, each of the latter analyzing all columns of a deck; by means of a deck shifting device the recording or marking mechanism common to all decks is, upon successive recording operations in each instance, automatically connected to all rows of analyzers below which there are provided the n decks of the control card so that, upon each deck recording operation, the control may be in each instance effected by all decks of the control cards.

If finally, different presettable column interchanging devices are in each instance automatically inserted in the operative connection between recording mechanism and the rows of analyzers coacting with said recording mechanism, the column interchanging devices permitting separately for each deck the effective analyzers to be wired to positions of the recording device corresponding to other columns, the machine permits column and deck interchangeability at will all over the card in a single card passage. For the column interchanging preferably multiple plugs are used which consist of crossing contact bars which may be electrically connected to each other at the crossing points by a plug and which may be inserted successively into the operative connection between rows of analyzers and recording mechanism. In order to avoid too large dimensions of the multiple plug, preferably a plurality of such layers of contact bars are arranged one below the other, which may be selectively rendered effective by using plugs of different length. The association of the individual contact bars with the rows of analyzers is here so effected that there exists in the plug board a row of plug holes for each column of the n decks of the control card and a row of plug holes for each column of the receiving card. Accordingly, herein the n columns which are successively recorded deck-by-deck by the recording mechanism are in each instance arranged adjacently. Column selection is effected by plugs of different length. Thus, in the plug board there is only a single row of plug holes required for each card column. The row of plug holes may be wired to different decks of the control card by the use of plugs of different length.

A card reproducer for multi-deck cards is known from German Patent 747,603. The latter, however, lacks not only the column interchangeability within one deck but also the interchangeability among the decks. Since the analysis and the punching operation are effected in the known reproducer column-by-column, the sequence of the columns of the receiving card is bound to the column sequence in the control card. And on account of the column-by-column operation, this type of machine is by far not so efficient as the type of machine to which the invention belongs.

Though the invention may be used for recording mechanisms of various types, it may be particularly advantageously applied in connection with a recording mechanism constructed as a punching device, thus resulting in a card reproducer for multi-deck cards. After corresponding plugging in the latter, the punching of a desired column of any desired deck of the pattern card may be transferred to any desired column of any desired deck of the receiving card in a single card passage. Consequently, the pattern cards may be "reproduced" with all desired data in a single card passage. The recording mechanism may, however, be constructed also in a different manner, for instance, as a printing mechanism, in case it is desired to use the receiving cards, for instance, as index cards without perforation or to effect the perforation only subsequently in accordance with the printed data on the receiving card.

An embodiment of the invention constructed as punched card reproducer for double-deck-cards is illustrated in the accompanying drawings.

Figs. 7 and 8 show the drive between the motor and the step-by-step shifting mechanism.

Fig. 9 shows the wiring diagram.

Fig. 10 shows diagrammatically the division of the plug board.

Fig. 11 shows diagrammatically the arrangement in layers of the plug board in perspective view, only one bar of each group being illustrated.

Fig. 12 shows the actual construction of the plug board in section and the plugs.

Principal operation of the machine

Figure 1:
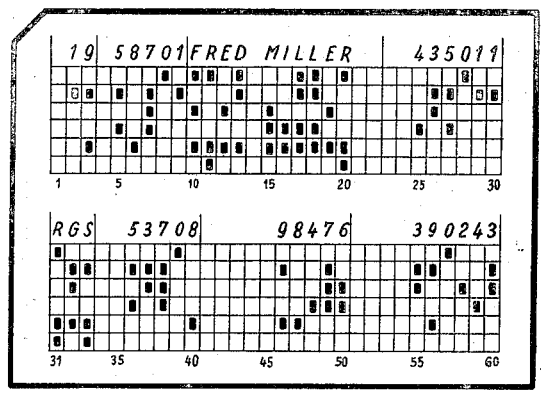
Fig. 1 shows a pattern card serving for the machine control.
Figure 2:
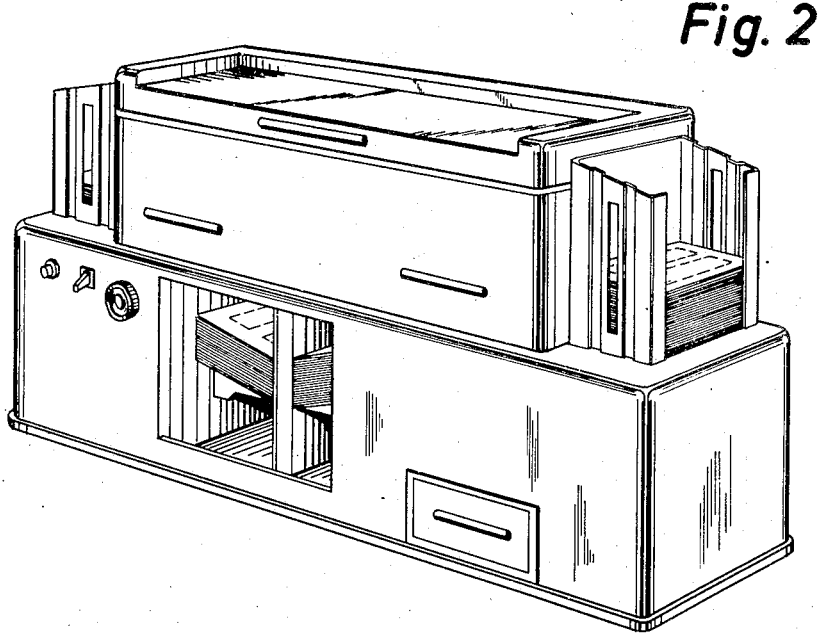
Fig. 2 shows a perspective general view of the machine.

The machine operates with cards an example of which is shown in Fig. 1. The card has two decks each comprising 30 columns, each column including six hole positions. The perforations in the cards are provided in hole combinations. The machine transfers perforation data which are already entered in cards to other cards, thereby providing the possibility that the data in the one card appear in another column or in another deck of the other card. This necessitates in the machine a setting device which permits combination of each punching device by each analyzing device.

The machine described herein includes now the advantage of smaller means for the punching device upon one card passage and of column interchanging at will within the two decks as well as between the two decks. This is obtained by passing the card from which the enterings shall be transferred below three sets of analyzers. Punching of the other card, however, is effected only below one set of punches for the various decks one after the other.

In the further description the card from which the result is analyzed (control card) shall be designated as "card I" and the card in which the results are punched (receiving card) shall be designated as "card II." The movement of the card I below the analyzing device has been so chosen that the two decks of the card are below the two first sets of brushes when the first deck of the card II is below the punching device. In both instances the upper deck is leading. The selector magnets W for the punching device may be connected with each brush of the two first sets of brushes through a particular setting device which will be referred to again later on. Accordingly, at the same time, data from the upper deck and from the lower deck of the card I may be transferred to the upper deck of card II. Transferring of the various hole positions is effected successively. The last position of the upper deck of card II having been punched, the lower deck is fed below the punching device. At the same time, the two decks of the card I are fed below the second and third set of brushes. During deck change the analyzing device is shifted through cams and shifting contacts to a second plug board, which is connected to the data of the lower deck of the card II. Now, similarly as in the first analyzing cycle, data may be transferred from the two decks of the card I through the second and third set of brushes to the lower deck of the card II. Shifting of the analyzing device and the interchanging of the columns will be referred to again later on. Subsequently to the second analyzing cycle, the two cards are fed to their card receivers.

Analyzing and punching

Figure 3:
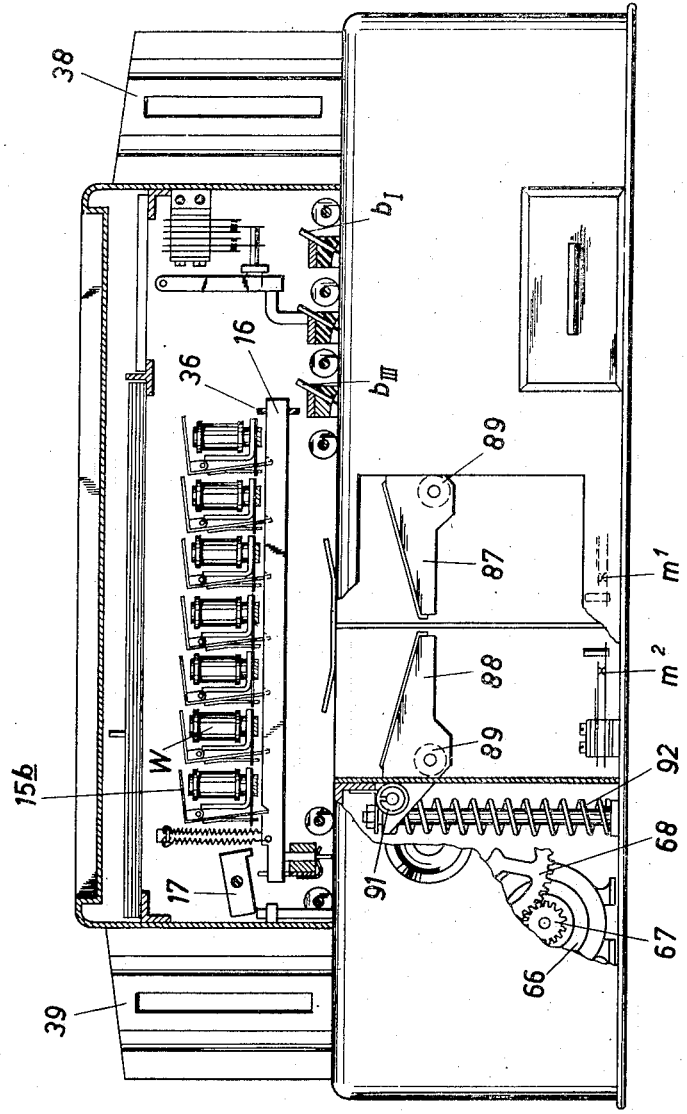
Fig. 3 shows the whole machine partially in section and partially in front view.
Figure 4:
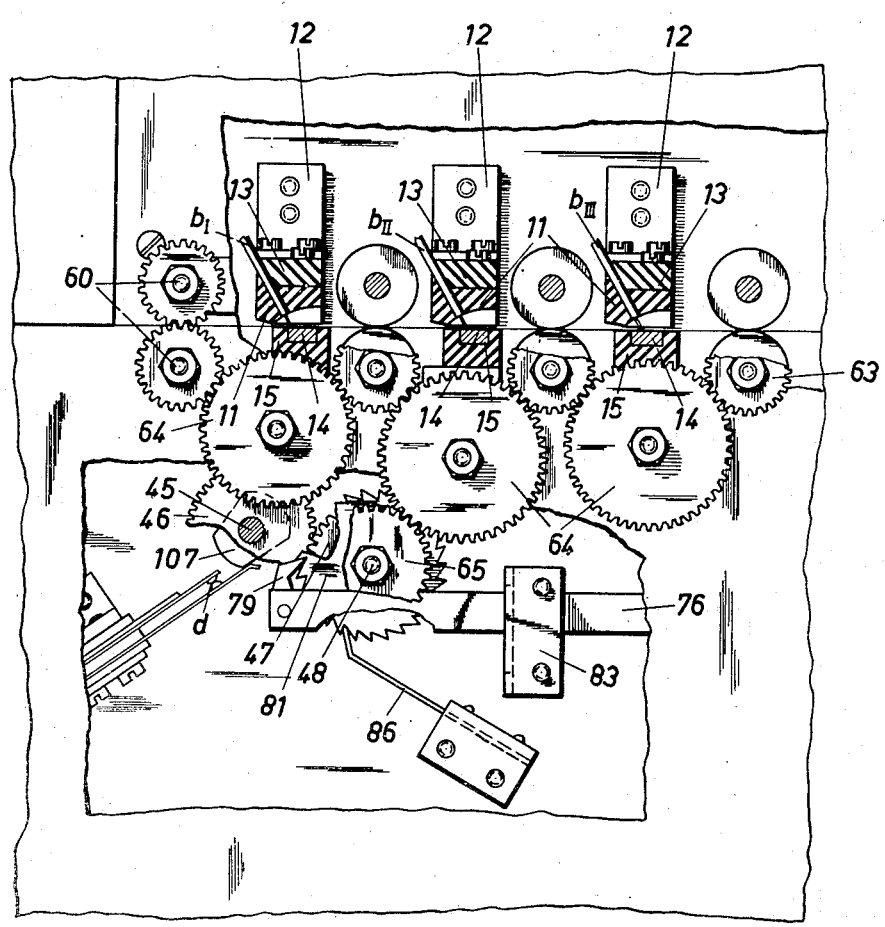
Fig. 4 shows the analyzing device and the drive for the feed rollers.
Figure 5:
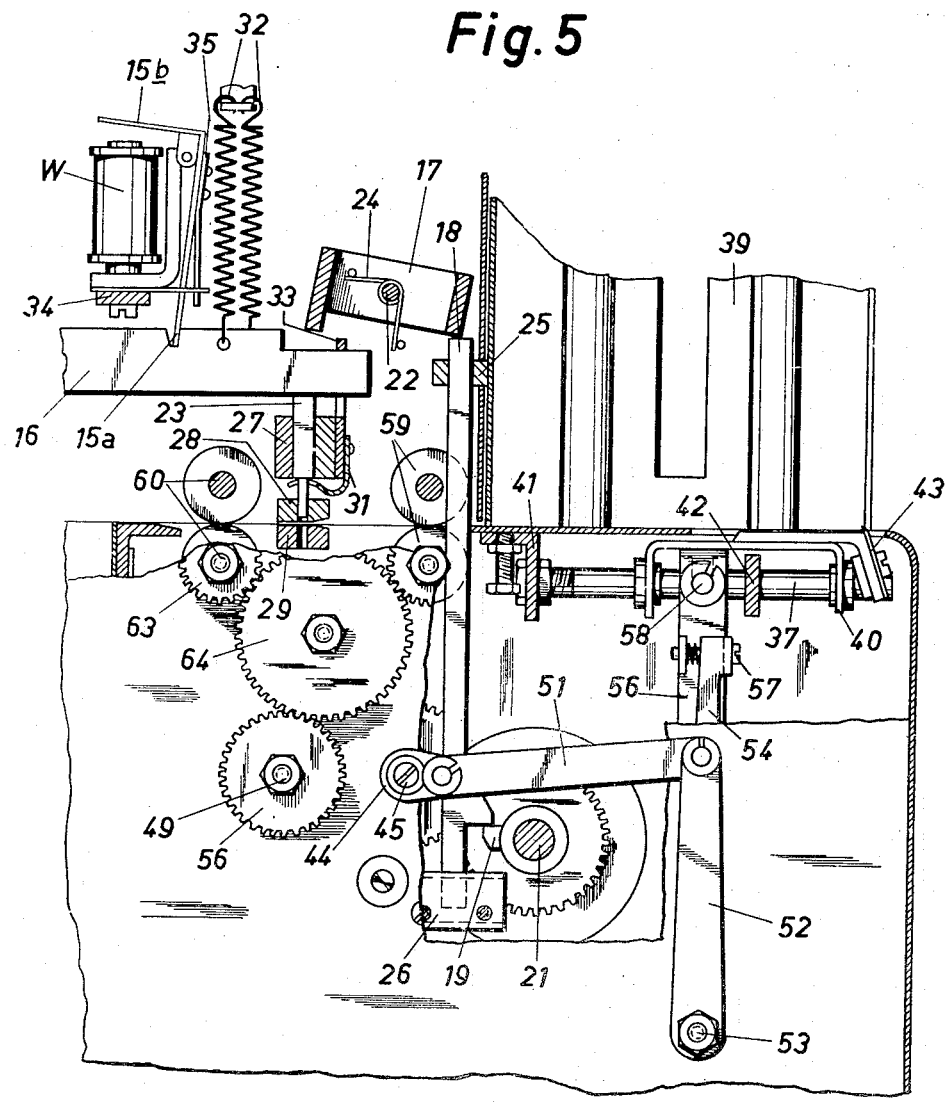
Fig. 5 shows the punching device as well as the drive of the card knives.

The analyzing of the pattern card is effected by the brushes $b_I$, $b_{II}$ and $b_{III}$ (Fig. 4) one after the other. Each set of brushes contains 30 brushes. The latter are held in the brush holders 11 which are screwed through the brackets 12 to the side walls of the machine. The brushes are fixed by the plate 13. The brushes receive current from the contact plates 14 in the bars 15 which are also fastened to the side walls of the machine. The sets of brushes are spaced apart by the distance of one deck division. The brushes receive current from the contact plates 14 through the holes of the card I and conduct this current to the selector magnets W (Figs. 3 and 5). The latter are energized and attract, their armatures 15b moving, by means of their arm 15a, the selector bars 16 to the left (Fig. 5) so that the full depth of the latter will come under the punching yoke 17.

Through the cam 19 on the shaft 21 which rotates once per feeding step the punching yoke 17 is rocked through the pusher bar 18 in counter-clockwise direction about its shaft 22, thus pressing the displaced selector bars 16 downwardly. The latter engage their punches 23 and press the same through the card. The shaft 22 for the punching yoke is mounted on the side walls of the machine. The spring 24 restores the yoke 17 and the pusher bar 18 again to their home position. The pusher bar 18 is guided at its upper part in the guide 25 and at its lower part in the bracket 26. The bracket 26 serves at the same time as a stop for the movement of the pusher bar in downward direction.

The punches 23 are guided by their shanks in a cross bar 27 which is fastened to the side walls of the machine. The rectangular part of the punch is also separately guided in a cross bar 28 which is fastened to the matrix 29. Between the cross bar 28 and the matrix 29 there is a gap through which the card may be fed. The springs 31 urge the punches 23 again to their home position. By springs 32 and through the armature 15b, by means of spring 35, the selector bars 16 are restored to their home position. The selector bars are guided in slots of the plate 33 which is fastened to the cross bar 27 as well as in the plate 36 (Fig. 3). The selector magnets W are screwed to the stirrups 34 which are fastened to the side walls of the machine.

Card feed

The cards I are inserted in the magazine 38 and the cards II in the magazine 39 (Fig. 3). Below the two magazines there are slides 40 (Fig. 5) which may slide to and fro upon the round guides 37. At the one end the guides 37 are screwed to the bracket 41 and are held by the cross bar 42. The slides 40 carry two adjustable knives 43. The movement of the slide is effected by the crank 44 on the shaft 45 which is driven through gears 46 and 47 (Fig. 7) from the locking wheel shaft 48 and 49 respectively. The ratio of the gears is 1:1. Through link 51 the rocker 52 is connected to the crank 44 (Figs. 5 and 6), said rocker being fast upon the shaft 53. Upon this shaft there is also fixedly mounted the lever 54. The lever 56, however, is loosely rotatable upon the shaft 53. The lever 56 is connected through the set screw 57 to the lever 54 and may be displaced with respect to the latter by means of the screw thereby permitting an exact adjustment of the card knives. At its upper end the lever 56 is forked and embraces a bolt 58 seated in an arm of the slide 40 and moving the latter during the rocking movement of the lever. The card knives 43 will then move the cards between the rollers 59.

The feed of the card to the analyzing or punching device and subsequently to the card receiver is effected by the rollers. The shafts 60 of the lower rollers are mounted in the side walls of the machine whereas the upper rollers are mounted in the arms 61 (Fig. 6), the latter being urged downward by the springs 62. To the one end of the shafts 60 are fastened gears 63. The gears of the upper rollers are in each instance in engagement with those of the lower rollers. Moreover, the gears of the lower rollers are meshing with idle gears 64 which transfer the movement to the various pairs of rollers. One of the idle gears 64 is meshing with the gear 70 of the shafts 48 and 49 respectively.

The drive of the shaft 48 or 49 is effected step-by-step through a step-by-step shifting mechanism from the motor 66 (Fig. 3). Through pinion 67 (Figs. 7 and 8) the motor drives the wheel 68 of the shaft 69, and from the latter the motor drives through the pinion 71 the gear 72 of the shaft 73. All the shafts just described are mounted in the side walls of the machine. The gear 72 drives the gear 74 which is rigidly connected to the cam 75 and is freely rotatable upon the shaft 49. The cam 75 actuates a lever 76 having the pawl 77 mounted on its arm 76a. The ratchet wheel 78 and therewith the shaft 49 are driven step-by-step by the pawl 77.

The drive of the shaft 48 is effected in the same manner through the lever 76 rockably mounted about a bolt in the middle portion of the machine and carrying on its other end the pawl 79 (Fig. 4) which engages the ratchet wheel 81. The lever 76 moves in the guides 82 and 83 (Figs. 4 and 7) and is drawn towards the cam 75 by the spring 84. The pawls 77 and 79 are resiliently urged against the ratchet wheels 78 and 81. In order to prevent a backward movement of the ratchet wheels 78 and 81, detent springs 85 and 86 are provided. Accordingly, the lever 76, driven by the cam 75, drives at the same time the ratchet wheels 78 and 81 through the pawls 77 and 79.

When the cards have passed through the analyzing and punching device, respectively, they drop upon the card supports 87 and 88 (Fig. 3) of the card receivers. The supports are guided by the rollers 89 and 91 and are urged upwardly by the springs 92. When the card support has reached its lower position it opens its contact $m^1$ and $m^2$ respectively thereby stopping the machine.

Plug board

As mentioned earlier in this specification, it is also possible to have an arbitrary column interchanging between the decks. The wiring needed therefor is in the present instance easy to supervise and easy to operate. This interchangeability is obtained by wireless plugging.

Each switching element which is to be combined with another one, i. e., the brushes with the selector magnets, has a bar associated therewith. The bars are so arranged relative to each other that they cross the bars of the switching elements to which they are to be electrically connected. Bars crossing each other are arranged in different layers. Whenever there is a crossing there is a hole in the bars. The connection between the bars may be established through plugs by inserting said plugs at the corresponding crossing points.

A particular feature of this plug board is that the bars are arranged in three layers. The arrangement of the various switching elements relative to each other has been so chosen that servicing becomes simple. The divisions in groups and layers is diagrammatically shown in Figs. 10 and 11. The 30 selector magnets are connected to the range W of Fig. 10. The brushes $b_{II}$ and $b_I$ are connected through the range $ub_{II}/ob_I$. As may be seen from Fig. 11, $ob_I$ is here arranged in the lowest layer. The brushes $b_{III}$ and $b_{II}$ are connected through the range $ub_{III}/ob_{II}$. In this instance the bars for the brushes $b_{II}$ are arranged in the lowest layer. As may be recognized from the foregoing explanations and from Figs. 10 and 11, two groups of bars are provided for the brushes $b_{II}$, said groups being arranged in different ranges. Depending upon whether the upper deck or the lower deck is below the punching device, either the lower or the upper bars (Fig. 10) of the plug board are connected thereto through shifting contacts. Shifting is effected by cam contacts which will be referred to again later on. Subsequently, depending on the position of the cards, the current circuit is either disconnected through the brushes $b_I$ or $b_{III}$ by means of cam contacts. When the upper and lower decks of the control card pass below the brushes $b_{II}/b_I$, the upper deck of the receiving card passes below the punching device. If the control card is advanced for one deck so that both decks pass now below $b_{III}/b_{II}$, the lower deck of the receiving card passes below the punching device.

If the card I is below the brushes $b_{II}$ and $b_I$, or if the upper deck of the card II is below the punching device, the bars of the lowest layer of the plug board are connected to the brushes $b_{II}$ and $b_I$ while the current circuit to the upper layer $ub_{III}$ and $ub_{II}$ is interrupted. Accordingly, current may only flow from the lower bars to the bars of the selector magnets. If the card I is further advanced so that it is below the brushes $b_{III}$ and $b_{II}$, and the lower deck of the card II is below the punching device, the cam contacts cause the lower bars to be disconnected and the upper ones to be connected so that now the bars of the selector magnets W receive current from the upper bars $ub_{III}$ and $ub_{II}$.

As may be seen from Fig. 1, the designation of the columns is continuous from the upper deck to the lower deck. These designations may be consecutively entered through the entire range of $ub_{III}/ob_{II}$ to $ub_{II}/ob_I$ since 60 bars are distributed in one layer over this range and each bar is associated with a column. The bars of the first and third layer, which are arranged one below the other, are herein associated with the corresponding column of the card I. Upon wiring, there is no longer a division into two decks thus effecting a simplification for the operator.

Determining of which deck of the receiving card shall have the data punched therein is effected by two kinds of plugs as are shown in Fig. 12. Fig. 12 shows also, in section, the arrangement of the plug board in layers. The bars are herein separated from each other by means of insulating plates 94.

The plug 95 extends through all three layers and is of insulating effect with respect to the upper layer. The plug thus connects only the lower layer with the middle layer. As has been mentioned already above, the lower layer is only in operative connection during the first analyzing cycle during which the upper deck of the card II is below the punching device. Consequently, perforations may be transferred from each of the 60 columns of the card I to the upper deck of the card II by means of plugs 95.

The plug 96 extends only through two upper layers so that it may establish a conducting connection between those two layers. As mentioned above, the uppermost layer receives current only during the second analyzing cycle during which the lower deck of the card II is below the punching device. Consequently, perforations may be transferred from each of the 60 columns of the card I to the lower deck of the card II by plugs 96. For better distinguishing between the handles of the two plugs they may be designated by different colours.

Each of the 30 bars Ws is designated by its corresponding two column numbers. For better distinguishing between these two numbers as pertaining to the upper deck or to the lower deck, they may be provided in colors corresponding with those of the plugs.

Contact control

Figure 6:
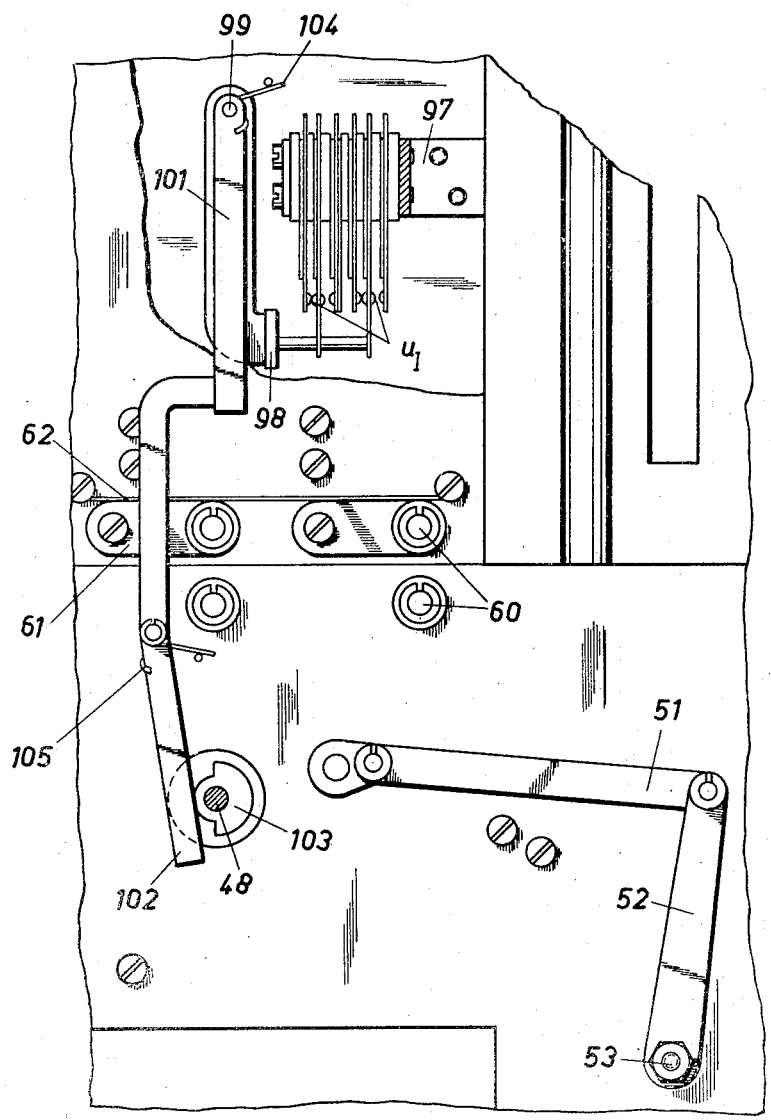
Fig. 6 shows the drive of the shifting contacts for the deck shifting.

As just described, upon deck change and card change, respectively, the brushes $b_{II}$ are shifted from the one to the other bar. Besides that upon deck change the brushes $b_I$ are disconnected and the brushes $b_{III}$ connected, or upon card change the brushes $b_{III}$ are disconnected and the brushes $b_I$ connected. This shifting operation is obtained by means of the contacts $u_I$ and $u_{II}$ (Figs. 6 and 9). Their position in the current circuit will be referred to later on in the description of the wiring.

Shifting of the brushes $b_{II}$ between the two sets of switching bars $ob_{II}$ and $ub_{II}$ is effected by means of the contact $u_I$. Accordingly, 30 contacts $u_I$ are to be provided. The contact $u_{II}$, however, needs only be provided once. It shifts the current circuit from the contact plate of the brushes $b_I$ to the contact plate of the brushes $b_{III}$ or vice versa. The 30 contacts $u_I$, as well as the one contact $u_{II}$, are mounted on the stirrup 97 (Fig. 6) which is screwed to the side walls of the machine. In order to save space, in each instance two shifting contacts have been arranged one above the other. The contacts are actuated by the yoke 98 which is firmly mounted on the shaft 99. The shaft 99, also firmly connected to the lever 101, is rocked through the lever 102 by cam 103 in clockwise direction. The yoke 98 is held by spring 104 in its home position. The lever 102 is pressed by spring 105 on the cam 103. The latter is mounted on the shaft 48 which rotates once per card cycle. The dimensions and the position of the cam have been so chosen that it shifts the contacts on each deck change and on arrival of the next card. Raising of the brushes from the card while energized must be prevented since otherwise harmful sparking may occur. Consequently, current may flow only so long as the brushes are on the contact plate and the current must be interrupted before the brushes are raised from the card. This is obtained by the impulse contact $i$ (Fig. 7). It is controlled by the cam 106 on the shaft 21 which rotates once per card step. Position and dimensions of the cam 106 have been so chosen that a current impulse flows through the brushes as soon as there is a hole position under the same.

Moreover, the current can flow to the brushes only if there is a deck under the same. During deck or card change the current circuit to the brushes must be interrupted in order to avoid erroneous connections. This is obtained by the contact $d$ (Fig. 4). The latter is controlled by the cam disk 107 rotating upon the shaft 45 once per card cycle. As has already been mentioned above, the shaft 45 serves, at the same time, for driving of the card knives. The shape of the cam, as well as its position, have been so determined that the current circuit is interrupted on deck change and on arrival of the next card respectively.

Wiring (Fig. 9)

In the illustration of the wiring for the card reproducer, a simplified method has been chosen such as is generally used in the art of communication. If several identical units are provided, such as clutch magnets or brushes, only one of them is shown in the wiring while the remainder are indicated by the distribution connections only. The number of the units is indicated by the Arabic index number. The magnets are indicated by capital letters and the contacts by lower case letters. Manually actuated contacts are characterized by a key-like hook on the upper end of the movable contact member. The contacts are shown in the positions which they occupy if the machine is at rest.

When the machine is switched on it does not yet start to run. Only when the start key $a$ is depressed does the motor receive current through said key so that it will start to run and will feed cards to the analyzing and punching device respectively. If the upper deck of the card I arrives under the middle set of analyzers, it actuates a card lever of known construction which has been omitted in the drawing for reasons of clarity. The card lever closes its contact $k^1$. At the same time the card II has arrived at the punching device and also actuates there a card lever which closes the contact $k^2$. Now, current can flow from negative through the contacts $k^2$, $m^2$, $m^1$, $k^1$ to the motor so that the start key $a$ can be released.

When the first hole position is under the analyzing device the two cam contacts $i$ and $d$ are also closed so that current can flow from negative through the contacts $k^2$, $m^2$, $m^1$, $k^1$, $i$, $d$, through the brushes $b_{II}$, contacts $u_I$, the plug board indicated symbolically by a circle in dotted lines, through the selector magnets W to positive. The selector magnets respond and adjust the selector bars 16 accordingly. At the same time, however, current flows also through the contact $u_{II}$, the brushes $b_I$, the plug board, through the selector magnets W to positive. In accordance with the plugging on the plug board and the perforation in the card, now the selector magnets may respond through the brushes $b_I$ and $b_{II}$. Shortly before the card is fed to the next position, the cam contact $i$ opens and interrupts the entire controlling current circuit.

If the next position is under the brushes the contact $i$ closes and the current circuit is again established as has just been described.

When the upper deck of the card II has been punched the two decks of the card I are fed under the brushes $b_{III}$ and $b_{II}$ and the lower deck of the card II under the punches. At the same time, the contacts $u_I$ and $u_{II}$ are shifted by the cam 103 so that now current flows from the contact $i$ through the contact $d$, the brushes $b_{II}$, the contact $u_I$ through the second bars of the plug board through the selector magnets W to positive. At the same time, current may flow also from the contact $i$ through the contacts $d$, $u_{II}$, through the brushes $b_{III}$, the plug board, through the selector magnets W to positive. The latter are energized in accordance with the perforations in the card and the plugging in the plug board and displace their selector bars 16. Analyzing of the various positions is now again effected one after the other.

After analysis of the last position, the card I and the card II are fed to the card receivers. At the same time, the contacts $u_I$ and $u_{II}$ return to their initial position and the operating cycle just described is repeated for the next card.

If one of the two card receivers is filled with cards, either the contact $m^1$ or $m^2$ is opened, thereby interrupting the whole current circuit and stopping the machine. The same will occur if no more cards are fed. In this instance one of the two card levers returns to its home position whereby its contact $k^1$ and $k^2$ respectively, opens, thereby also interrupting the current circuit.

I claim:

1. In an automatic multiple deck card reproducing machine for marking a set of receiving cards under the control of a set of pattern cards, each of said cards having two decks, each deck having a row of adjacent columns aligned with corresponding columns of the other deck, each column having a plurality of index positions, in combination, a pattern card feeding path; three sets of analyzing means arranged across said pattern card feeding path transverse to the feeding direction, said sets of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third sets of analyzing means with said sets of columns arranged transverse to said pattern card feeding path; a receiving card feeding path; a set of marking means arranged across said receiving card feeding path transverse to the feeding direction; receiving card feeding means for feeding said receiving cards along said receiving card feeding path to said set of marking means with said rows of columns arranged transverse with respect to said receiving card feeding path; means for synchronizing said pattern card feeding means and said receiving card feeding means so that the first and second sets of said three sets of analyzing means simultaneously analyze the two decks of each fed pattern card while said set of marking means is located over the leading deck of a simultaneously fed receiving card, and so that the second and third sets of said three sets of analyzing means simultaneously analyze the two decks of each fed pattern card while said set of marking means is located over the trailing deck of the simultaneously fed receiving card; means for controlling said marking means by said analyzing means; and selecting means for selecting any marking means upon the passage of any deck of the receiving card for control by any column of any deck of the pattern card.

2. In an automatic multiple deck card reproducing machine for punching a set of receiving cards under the control of a set of pattern cards, each of said cards having two decks, each deck having a row of adjacent columns aligned with corresponding columns of the other deck, each column having a plurality of index positions, in combination, a pattern card feeding path; three sets of analyzing means arranged across said pattern card feeding path transverse to the feeding direction, said sets of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third sets of analyzing means with said sets of columns arranged transverse to said pattern card feeding path; a receiving card feeding path; a set of punches arranged across said receiving card feeding path transverse to the feeding direction; receiving card feeding means for feeding said receiving cards along said receiving card feeding path to said set of punches with said rows of columns arranged transverse with respect to said receiving card feeding path; means for synchronizing said pattern card feeding means and said receiving card feeding means so that the first and second sets of said three sets of analyzing means simultaneously analyze the two decks of each fed pattern card while said set of punches is located over the leading deck of a simultaneously fed receiving card, and so that the second and third sets of said three sets of analyzing means simultaneously analyze the two decks of each fed pattern card while said set of punches is located over the trailing deck of the simultaneously fed receiving card; means for controlling said punches by said analyzing means; and selecting means for selecting any punch upon the passage of any deck of the receiving card for control by any column of any deck of the pattern card.

3. In an automatic multiple deck card reproducing machine for punching a set of receiving cards under the control of a set of pattern cards, each of said cards having two decks, each deck having a row of adjacent collums aligned with corresponding columns of the other deck, each column having a plurality of index positions, in combination, a pattern card feeding path; three rows of analyzing means arranged across said pattern card feeding path transverse to the feeding direction, each row of analyzing means having one analyzing means for each record column, said rows of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third rows of analyzing means with said rows of columns arranged transverse to said pattern card feeding path; a receiving card feeding path; a row of punches arranged across said receiving card feeding path transverse to the feeding direction and having one punch for each column; receiving card feeding means for feeding said receiving cards along said receiving card feeding path to said row of punches with said rows of columns arranged transverse with respect to said receiving card feeding path; means for synchronizing said pattern card feeding means and said receiving card feeding means so that the first and second rows of said three rows of analyzing means simultaneously analyze corresponding index positions in aligned columns of the two decks of each fed pattern card while said row of punches is located over corresponding index positions of the leading deck of a simultaneously fed receiving card, and so that the second and third rows of said three rows of analyzing means simultaneously analyze corresponding index positions in aligned colums of the two decks of each fed pattern card while said row of punches is located over corresponding index positions of the trailing deck of the simultaneously fed receiving card; means for automatically setting said row of punches under the control of said first and second rows of analyzing means when the leading deck of a receiving card passes said row of punches, and for setting said row of punches under the control of said second and third row of said analyzing means when the trailing deck of receiving cards passes said row of punches; and pre-settable means for selecting on each passage of a deck of a receiving card under said row of punches the control of the latter by the respective two rows of analyzing means.

4. In an automatic multiple deck card reproducing machine for punching a set of receiving cards under the control of a set of pattern cards, each of said cards having two decks, each deck having a row of adjacent columns aligned with corresponding columns of the other deck, each column having a plurality of index positions, in combination, a pattern card feeding path; three rows of analyzing means arranged across said pattern card feeding path transverse to the feeding direction, each row of analyzing means having one analyzing means for each record column, said rows of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third rows of analyzing means with said rows of columns arranged transverse to said pattern card feeding path; a receiving card feeding path; a row of punches arranged across said receiving card feeding path transverse to the feeding direction and having one punch for each column; receiving card feeding means for feeding said receiving cards along said receiving card feeding path to said row of punches with said rows of columns arranged transversely with respect to said receiving card feeding path; means for synchronizing said pattern card feeding means and said receiving card feeding means so that the first and second rows of said three rows of analyzing means simultaneously analyze corresponding index positions in aligned columns of the two decks of each fed pattern card while said row of punches is located over corresponding index positions of the leading deck of a simultaneously fed receiving card, and so that the second and third rows of said three rows of analyzing means simultaneously analyze corresponding index positions in aligned columns of the two decks of each fed pattern card while said row of punches is located over corresponding index positions of the trailing deck of the simultaneously fed receiving card; means for controlling said punches by said analyzing means; and means for selecting any punch of said row of punches upon the passage of any deck of a receiving card for the control by any column of any deck of the pattern card.

5. In an automatic multiple deck card reproducing machine for punching a set of receiving cards under the control of a set of pattern cards, each of said cards having two decks, each deck having a row of adjacent columns aligned with corresponding columns of the other deck, each column having a plurality of index positions, in combination, a pattern card feeding path; three rows of analyzing means arranged across said pattern card feeding path transverse to the feeding direction, each row of analyzing means having one analyzing means for each record column, said rows of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third rows of analyzing means with said rows of columns arranged transverse to said pattern card feeding path; a receiving card feeding path; a row of punches arranged across said receiving card feeding path transverse to the feeding direction and having one punch for each column; receiving card feeding means for feeding said receiving cards along said receiving card feeding path to said row of punches with said rows of columns arranged transverse with respect to said receiving card feeding path; means for synchronizing said pattern card feeding means and said receiving card feeding means so that the first and second rows of said three rows of analyzing means simultaneously analyze corresponding index positions in aligned columns of the two decks of each fed pattern card while said row of punches is located over corresponding index positions of the leading deck of a simultaneously fed receiving card, and so that the second and third rows of said three rows of analyzing means simultaneously analyze corresponding index positions in aligned columns of the two decks of each fed pattern card while said row of punches is located over corresponding index positions of the trailing deck of the simultaneously fed receiving card; means for automatically setting said row of punches under the control of said first and second rows of analyzing means when the leading deck of a receiving card passes said row of punches, and for setting said row of punches under the control of said second and third row of said analyzing means when the trailing deck of receiving cards passes said row of punches; and pre-settable means for selectively setting each punch under the control of a selected row of analyzing means of the respective two controlling rows of analyzing means so as to select from any one of the two decks of each pattern card the index positions punched in each column in each deck of the simultaneously fed receiving card.

6. In an automatic multiple deck card reproducing machine for punching a set of receiving cards under the control of a set of pattern cards, each of said cards having two decks, each deck having a row of adjacent columns aligned with corresponding columns of the other deck, each column having a plurality of index positions, in combination, a pattern card feeding path; three rows of analyzing means arranged across said pattern card feeding path transverse to the feeding direction, each row of analyzing means having one analyzing means for each record column, said rows of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third rows of analyzing means with said rows of columns arranged transverse to said pattern card feeding path; a receiving card feeding path; a row of punches arranged across said receiving card feeding path transverse to the feeding direction and having one punch for each column; receiving card feeding means for feeding said receving cards along said receiving card feeding path to said row of punches with said rows of columns arranged transverse with respect to said receiving card feeding path; means for synchronizing said pattern card feeding means and said receiving card feeding means so that the first and second rows of said three rows of analyzing means simultaneously analyze corresponding index positions in aligned columns of the two decks of each fed pattern card while said row of punches is located over corresponding index positions of the leading deck of a simultaneously fed receiving card, and so that the second and third rows of said three rows of analyzing means simultaneously analyze corresponding index positions in aligned columns of the two decks of each fed pattern card while said row of punches is located over corresponding index positions of the trailing deck of the simultaneously fed receiving card; means for automatically setting said row of punches under the control of said first and second rows of analyzing means when the leading deck of a receiving card passes said row of punches, and for setting said row of punches under the control of said second and third row of said analyzing means when the trailing deck of receiving cards passes said row of punches; and presettable means for selectively setting each punch under the control of a selected analyzing means of the respective two controlling rows of analyzing means so as to select from any one column of any one of the two decks of each pattern card the index position punched in each column of each deck of the simultaneously fed receiving card.

7. In an automatic multiple deck card reproducing machine for punching a set of receiving cards under the control of a set of pattern cards, each of said cards having two decks, each deck having a row of adjacent columns aligned with corresponding columns of the other deck, each column having a plurality of index positions, in combination, a pattern card feeding path; three rows of analyzing means arranged across said pattern card feeding path transverse to the feeding direction, each row of analyzing means having one analyzing means for each record column, said rows of analyzing means being spaced from each other along said pattern card feeding path a distance corresponding to the distance of corresponding index positions in the two decks of said pattern cards; pattern card feeding means for feeding the pattern cards along said pattern card feeding path so that the pattern cards pass successively the first, second and third rows of analyzing means with said rows of columns arranged transverse to said pattern card feeding path; a receiving card feeding path; a row of punches arranged across said receiving card feeding path transverse to the feeding direction and having one punch for each column; receiving card feeding means for feeding said receiving cards along said receiving card feeding path to said row of punches with said rows of columns arranged transverse with respect to said receiving card feeding path; means for synchronizing said pattern card feeding means and said receiving card feeding means so that the first and second rows of said three rows of analyzing means simultaneously analyze corresponding index positions in aligned columns of the two decks of each fed pattern card while said row of punches is located over corresponding index positions of the leading deck of a simultaneously fed receiving card, and so that the second and third rows of said three rows of analyzing means simultaneously analyze corresponding index positions in aligned columns of the two decks of each fed pattern card while said row of punches is located over corresponding index positions of the trailing deck of the simultaneously fed receiving card; a set of electromagnet means respectively associated with and controlling the punches of said row of punches; circuit means including automatically operating contact means for connecting said electromagnet means with said first and second rows of analyzing means when the leading deck of a receiving card passes said row of punches, and for connecting said electromagnet means with said second and third row of said analyzing means when the trailing deck of receiving cards passes said row of punches; and pre-settable means for selectively setting each electromagnet means under the control of a selected analyzing means of the respective two controlling rows of analyzing means so as to select from any one column of any one of the two decks of each pattern card the index position punched in each column of each deck of the simultaneously fed receiving card.

8. A machine as set forth in claim 7 wherein said circuit means include a first set of conductors respectively connected to said electromagnet means; a second set of conductors respectively connected to the analyzing means of said first and second row of analyzing means and respectively associated with the columns of the two decks of the pattern cards; a third set of conductors respectively connected to said second and third rows of analyzing means and respectively associated with the columns of the two decks of the pattern cards; and wherein said presettable means include manually operable conductive connecting means for selectively connecting the conductors of said first set of conductors with the conductors of said second and third sets of conductors.

9. A machine as set forth in claim 7 wherein said circuit means include a first set of conductor bars respectively connected to said electromagnet means; a second set of conductor bars extending transverse to said first set of conductor bars and being respectively connected to the analyzing means of said first and second rows of analyzing means and respectively associated with the columns of the two decks of the pattern cards; a third set of conductor bars extending transverse to said first set of conductor bars and being respectively connected to the analyzing means of said second and third rows of analyzing means, said conductor bars of said second and third sets of conductor bars being insulated from and crossing the conductor bars of said first set of conductor bars at superimposed crossing points, each conductor bar being formed at said crossing points with a bore aligned with the other bores at the respective crossing point; and wherein said pre-settable means include plug means located in said bores and connecting the conductor bars of said first set of conductor bars with selected conductor bars of said second and third sets of conductor bars.

10. A machine as set forth in claim 9 wherein said second and third sets of conductor bars are arranged in parallel layers on both sides of said first set of conductor bars.

References Cited in the file of this patent

UNITED STATES PATENTS

| | | |
|---|---|---|
| 1,691,917 | Braitmayer | Nov. 20, 1928 |
| 1,950,476 | Bryce | Mar. 13, 1934 |
| 1,962,750 | Read | June 12, 1934 |